United States Patent
Nesbitt, III (10) Patent No.: US 11,634,191 B2
(45) Date of Patent: Apr. 25, 2023

(54) ELECTRIC MOTORCYCLE WITH NOVEL SWING ARM CONFIGURATION

(71) Applicant: Curtiss Motorcycle Company, Inc., Leeds, AL (US)

(72) Inventor: James Thomas Nesbitt, III, New Orleans, LA (US)

(73) Assignee: Curtiss Motorcycle Company, Inc., Leeds, AL (US)

( * ) Notice: Subject to any disclaimer, the term of this patent is extended or adjusted under 35 U.S.C. 154(b) by 328 days.

(21) Appl. No.: 16/896,436

(22) Filed: Jun. 9, 2020

(65) Prior Publication Data
US 2021/0016852 A1 Jan. 21, 2021

Related U.S. Application Data

(60) Provisional application No. 62/876,542, filed on Jul. 19, 2019.

(51) Int. Cl.
| | | |
|---|---|---|
| *B62K 11/02* | (2006.01) |
| *B62K 25/20* | (2006.01) |
| *B62K 25/28* | (2006.01) |
| *B62K 19/44* | (2006.01) |
| *B62K 19/10* | (2006.01) |

(52) U.S. Cl.
CPC ............ *B62K 11/02* (2013.01); *B62K 25/20* (2013.01); *B62K 19/10* (2013.01); *B62K 19/44* (2013.01); *B62K 25/283* (2013.01); *B62K 2204/00* (2013.01)

(58) Field of Classification Search
CPC ........ B62K 11/02; B62K 25/20; B62K 19/10; B62K 19/44; B62K 25/283; B62K 2204/00; B62K 11/04; B62K 19/08; B62K 25/24; B62J 13/04
See application file for complete search history.

(56) References Cited

U.S. PATENT DOCUMENTS

| | | | |
|---|---|---|---|
| 5,996,718 A * | 12/1999 | Desrosiers ........... | B62K 25/283 280/283 |
| 8,939,458 B2 | 1/2015 | Nesbitt, III | |
| 9,033,838 B2 * | 5/2015 | Kluge .................. | F16H 57/035 180/65.6 |
| 9,327,802 B1 * | 5/2016 | Chang ..................... | B62M 7/08 |
| 2006/0225942 A1 * | 10/2006 | Weagle ................. | B62K 25/04 180/358 |
| 2007/0056789 A1 * | 3/2007 | Miyabe ................. | B62K 11/04 180/219 |
| 2011/0272906 A1 | 11/2011 | Hall et al. | |

(Continued)

FOREIGN PATENT DOCUMENTS

| | | | | |
|---|---|---|---|---|
| DE | 102014215936 A1 * | 3/2015 | .............. | B62J 43/16 |
| JP | 2000038184 A * | 2/2000 | ........... | B62K 25/283 |

*Primary Examiner* — Jacob D Knutson
(74) *Attorney, Agent, or Firm* — Lathrop GPM LLP (57) ABSTRACT

The present invention is generally directed to a swing arm configuration and, more specifically, a swing arm that is supported by a shaft of a motor, such as an electric motor of a motorcycle. The configuration includes a swing arm assembly that is supported by a shaft of a motor at one end and a rear axle at the other end. Advantageously, the shaft of the motor may be a structural component of an electric motorcycle and serve as the swing arm pivot as well as the drive shaft.

12 Claims, 10 Drawing Sheets

(56) References Cited

U.S. PATENT DOCUMENTS

| | | | |
|---|---|---|---|
| 2012/0080249 A1* | 4/2012 | Yates, III | B60L 50/90 |
| | | | 701/22 |
| 2013/0313861 A1* | 11/2013 | Koyama | B62J 15/00 |
| | | | 296/198 |
| 2016/0272266 A1* | 9/2016 | Hosoya | B62K 11/04 |

\* cited by examiner

ELECTRIC MOTORCYCLE WITH NOVEL SWING ARM CONFIGURATION

CROSS-REFERENCE TO RELATED APPLICATIONS

This application claims benefit to U.S. Application No. 62/876,542 filed Jul. 19, 2019, which is hereby incorporated by reference in its entirety.

FIELD OF INVENTION

The invention relates generally to electric motorcycles, and more particularly, to a novel swing arm configuration for electric motorcycles.

BACKGROUND OF THE INVENTION

Many conventional vehicles, such as motorcycles include an engine supported within a frame. The frame is typically configured to couple with a front assembly and a rear assembly.

More specifically, conventional front assemblies support a front wheel of a motorcycle at its lower end. A front end suspension is attached to handlebars, which are mounted to the front assembly such that a user can steer the front wheel of the motorcycle. Common front end suspensions include a girder fork or girder front end suspension. A traditional girder fork has a pair of uprights that is connected to a front wheel axle on one end and two links on the other end. A spring, such as a coil spring or leaf spring, connects the lower link to an upper triple claim having a set of handle bars mounted thereon.

A conventional rear assembly often includes a swing arm configuration for supporting a rear wheel of the motorcycle. Traditionally, the swing arm has a rear end coupled to the rear wheel, and a front end coupled to the frame at a pivot point. More specifically, the swing arm is typically pivotally supported by, and extends in a rearward direction from, a portion of the frame.

Although conventional swing arm configurations may provide certain advantages, such as preventing or reducing squat, they also include several disadvantages.

One disadvantage of conventional swing arm configurations is the arrangement of mechanical components. In particular, a chain or belt is typically positioned between the swing arm and rear wheel. This arrangement may impede access to the chain, leading to additional labor and increasing the difficulty of maintenance. In addition, conventional swing arm configurations need frequent upkeep because of exposure to certain environmental conditions, such as rain, dirt, and dust. As such, users may need to regularly lubricate grease fittings to ensure proper operation of the swing arms.

Another disadvantage of conventional swing arm configurations is the need for excess materials. This is because conventional configurations typically require the frame to support both a swing arm and a motor. More specifically, additional hardware, such as nuts and bolts, may be required to support both the swing arm and motor. This may increases the overall weight and cost of a motorcycle.

Accordingly, there is a need for an electric motorcycle that includes an adaptive and cost effective swing arm configuration. In particular, there is a need for a swing arm configuration that reduces material, weight, and cost of a motorcycle. The present invention satisfies this need.

SUMMARY

The present invention is generally directed to a swing arm configuration and, more specifically, a swing arm that is supported by a shaft of a motor. Advantageously, the shaft serves as the swing arm pivot as well as the drive shaft.

The swing arm configuration may include a motor, a shaft, one or more swing arms, and a wheel. The swing arms may connect, via the shaft, to the motor at a first end and the wheel at a second end. It is contemplated that the motor can power a vehicle, such as a motorcycle, car, truck, recreational vehicle, and tractor, and other vehicles, such as bicycles and scooters.

The motor may include an electromechanical assembly formed from component parts. Component parts may include a housing and a number of mechanical parts, such as the shaft. The motor also comprises a number of parts for making electrical connections, as detailed below.

The shaft runs through the motor and transfers power from the motor to a chain or belt drive. A drive plate sits on the right side of the shaft and axle bolts are used on both sides to constrain the shaft and the swing arms.

In particular, portions of the shaft extend from both ends of the motor housing for connecting to the swing arms. The structure of the swing arm configuration facilitates support of the swing arms by the shaft. This configuration reduces the number of materials required and labor associated with removing and installing the swing arms relative to the shaft.

An exemplary swing arm configuration may include a swing arm, the swing arm having a first end and a second end. A motor of the configuration includes a shaft configured to support the first end of the swing arm and a rear wheel operatively connected to the second end of the swing arm. The shaft is operatively connected to a drive element, the drive element may mechanically connected to a driven element, and the driven element may operatively connected to the rear wheel. The swing arm is positioned between the driven element and the rear wheel. The swing arm of the configuration may further include a blade insert and a suspension blade. The blade insert includes an adjustable trail configured to alter an angle of the swing arm. In addition, the shaft may include a splined portion.

An exemplary electric motorcycle including a swing arm configuration may include a housing supported by a chassis, a power source, such as a battery, configured to supply power to a motor within the housing, and a shaft operatively connected to the motor and pivotably connected to a swing arm assembly, wherein said swing arm assembly is supported by said shaft, and said shaft mechanically connected to a rear wheel for transmitting rotational motion to the rear wheel.

The swing arm assembly may include one or more swing arms connected via a brace. The brace may be semi-circular to wrap around the rear wheel. Each swing arm may be substantially triangular in shape and include a blade insert and a suspension blade. The shaft may be positioned through an opening of the blade insert which is configured to rotate on bearings. The blade insert of each swing arm may include an idler gear for altering an angle of said swing arm assembly.

The motorcycle including a swing arm configuration may further include a front assembly including a front wheel connected to a suspension blade assembly including a suspension blade and a blade insert, and an eccentric mechanism of the blade insert configured to alter the distance between the front wheel and the chassis.

Additional objects and features of the invention will appear from the following description in which the embodiments of the invention are described in detail.

BRIEF DESCRIPTION OF THE DRAWINGS

The preferred embodiments of the invention will be described in conjunction with the appended drawings provided to illustrate and not to limit the invention, where like designations denote like elements, and in which.

DETAILED DESCRIPTION OF THE INVENTION

The present invention is generally directed to a swing arm configuration and, more specifically, a swing arm that is supported by a shaft of a motor. Advantageously, the shaft of the motor may be a structural component of a motorcycle and serve as the swing arm pivot as well as the drive shaft.

Figure 1:
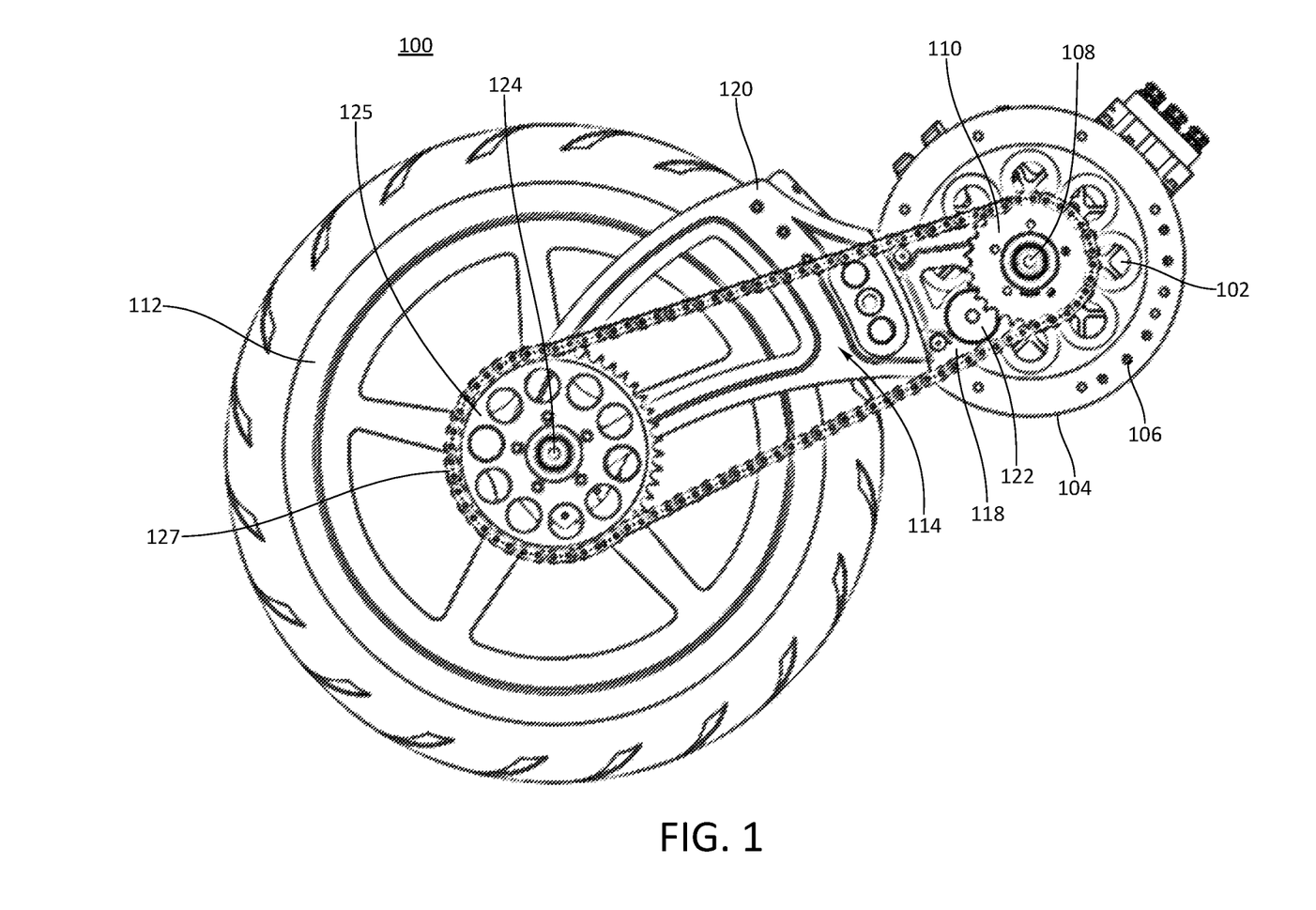
FIG. 1 illustrates a front view of an exemplary swing arm configuration.

Turning to the figures, FIG. 1 illustrates a front view of an exemplary swing arm configuration 100. The configuration 100 includes a motor 102, such as an electric motor, housed within housing 104. Housing 104 may include portions which rotate on bearings and further include apertures 106 for mounting to, for example, a chassis plate, frame assembly, or another component of a motorcycle. In certain embodiments, the housing is water and dustproof and is rated at IP67.

The motor 102 includes a shaft 108 which extends from both ends of housing 104. As shown, one end of the shaft 108 is connected to a drive sprocket 110. The drive sprocket 110 is configured to transmit driving force from the shaft 108 to a rear wheel 112.

Figure 2A:
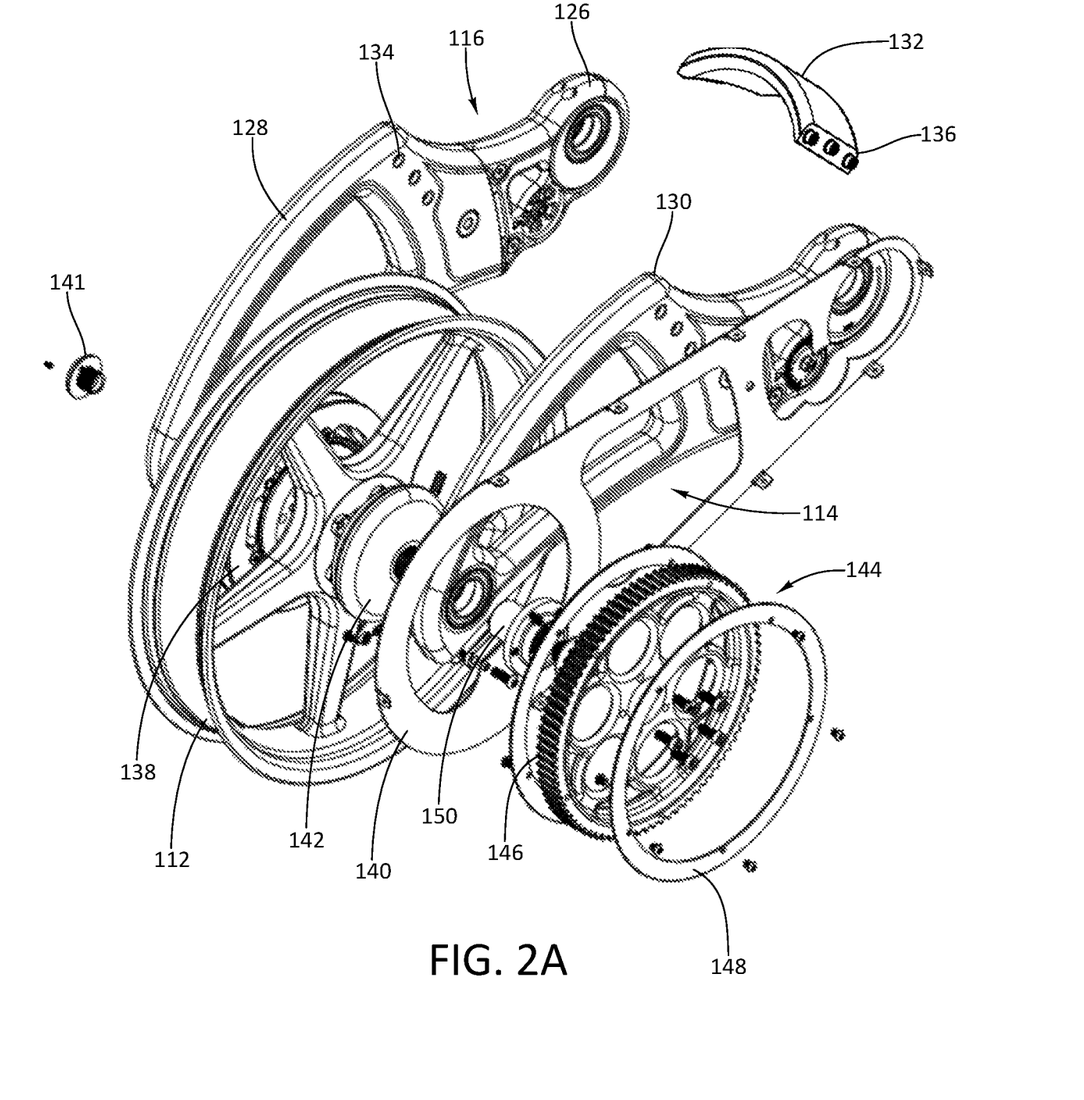
FIG. 2A illustrates a partial exploded view of the exemplary swing arm configuration of FIG. 1.
Figure 2B:
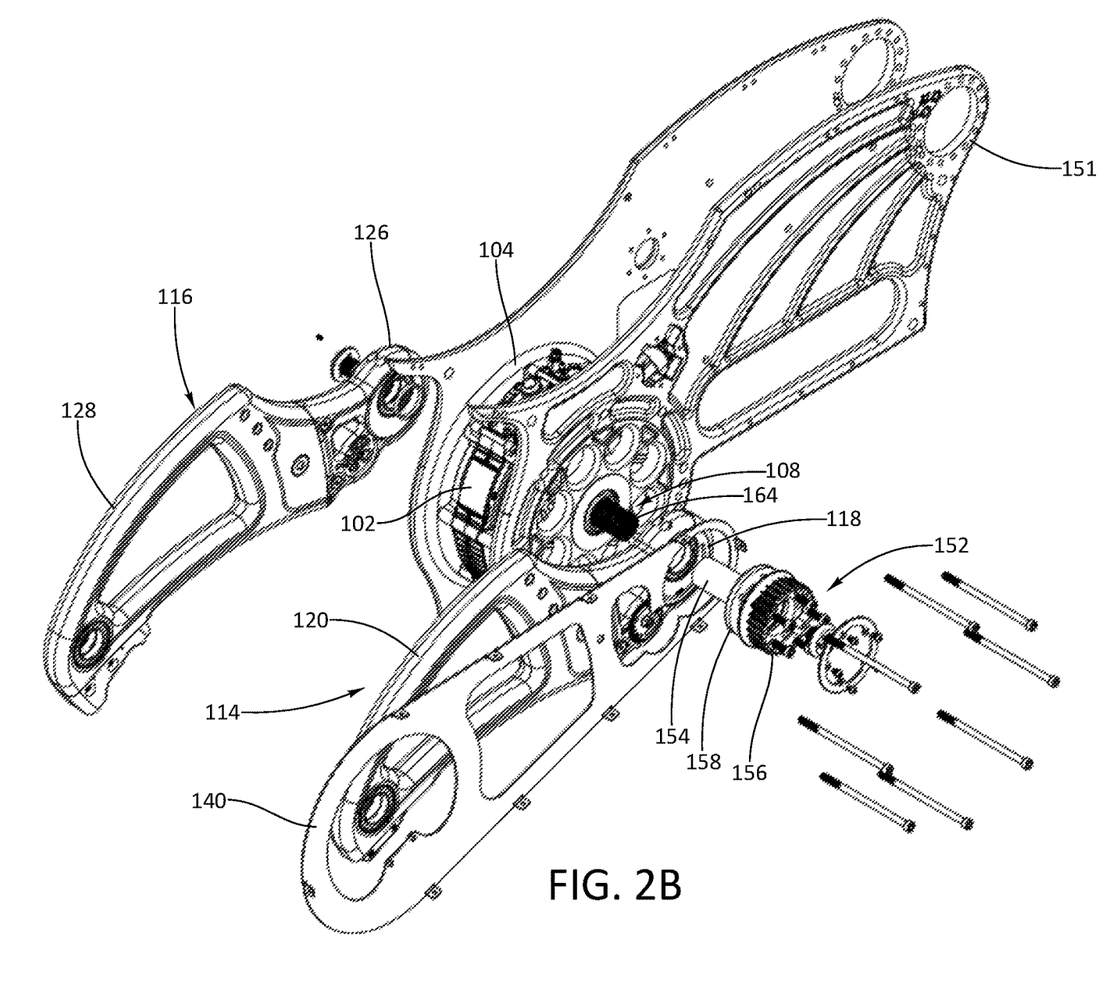
FIG. 2B illustrates a partial exploded view of the exemplary swing arm configuration of FIG. 1.

The motor 102 is coupled a right swing arm 114 and a left swing arm 116 (see FIG. 2A and FIG. 2B). The swing arms 114, 116 may include bearings, bushings, or combinations of each for pivotably connecting to the shaft 108. The bearings or bushings may comprise ball bearings, roller bearings, needle bearings, tapered roller bearings, bronze or nylon bushings, or other bearing or bushing designs. One example ball bearing is a McMaster-Carr® 62×40×12 mm bearing that may dissipate heat more efficiently than shielded and sealed bearings. Swing arms 114, 116 or portions thereof may be constructed from carbon fiber, steel, aluminum alloy, other metal alloys, composite materials, or combinations of each.

As shown, the right swing arm 114 includes a blade insert 118. The blade insert 118 is positioned between the drive sprocket 110 and the housing 104. A portion of the shaft 108 projecting from housing 104 may support the blade insert 118. More specifically, the shaft 108 extends through an opening of the blade insert 118 defined by a circular portion, which is configured to rotate on bearings. In certain embodiments, blade insert 118 is coupled to the housing 104 through apertures 106, which thread into the motor 102.

Furthermore, blade insert 118 includes an adjustable trail 122 or idler gear. The adjustable trail 122 is threaded along its rotational axis and is held in place by a flanged nut. These gear driven units may alter the effective swing arm angles. The angle of the swing arms 114, 116 may dictate the action of the rear suspension under acceleration, and may either causes compression or rebound. In certain embodiments, the swing arm pivot is attached directly to the shaft 108 and utilizes an adjustable suspension push rod to facilitate selecting alternate swing arm angles by adjustment of the push rod length. This adjustment may allow for precision tuning for a variety of wheel sizes, rake angles, and rider weights while maintaining appropriate ground clearances.

The right swing arm 114 also includes a suspension blade 120. At a front end of the swing arm 114, the suspension blade 120 may connect to the blade insert 118 with glue and/or hardware, such as four m8×1.25 flat head screws.

At a rear end of the swing arm 114, a rear axle 124 couples the wheel 112 and the suspension blade 120. The rear axle 124 defines an axis of rotation of the wheel 112 relative to each swing arm 114, 116. In particular, the rear axle 124 is positioned through an opening defined by a circular portion of the suspension blade 120, which is configured to rotate on bearings. While the suspension blade 120 is shown to have a substantially triangular shape and opening to remove or reduce unsprung weight, other shapes are contemplated.

In addition, a portion of the rear axle 124 projects from the suspension blade 120 and supports a driven sprocket 125. In certain embodiments, the rear axle 124 may include ridges or teeth for mating with grooves of, for example, the driven sprocket 125. Once the driven sprocket 125 is secured to the suspension blade 120, a chain 127 or belt may be wound around the drive sprocket 110 and driven sprocket 125 for transmitting driving force from the shaft 108 to the rear wheel 112. As shown, the chain 127 is positioned exterior to the swing arm 114 such that a user or mechanic may easily access the chain 127. Further, this configuration permits users to, for example, maintain and lubricate grease fittings more efficiently to ensure proper operation of the swing arm 114.

FIG. 2A and FIG. 2B illustrate exploded perspective views of the swing arm configuration 100 of FIG. 1. As shown, the swing arm configuration 100 includes a left swing arm 116 on the left side of the wheel 112. Similar to the right swing arm 114, the left swing arm 116 includes a blade insert 126 configured to connect to a suspension blade 128 via glue and/or hardware, such as four m8×1.25 flat head screws. At a front end, the blade insert 126 may be supported on a portion of the shaft 108 projecting from the left side of housing 104. At a rear end, the suspension blades 120, 128 connects to the rear axle 124 of the wheel 112.

As shown in FIG. 2A, swing arms 114, 116 may connect via brace 132. The brace 132 may have a semi-circular shape for wrapping around wheel 112. Both suspension blades 120, 128 may include blade connectors 134 for receiving brace connectors 136. In certain embodiments, blade connectors 134 are positioned proximate to the top edge 130 of each respective swing arm 114, 116. It is contemplated that right swing arm 114 may have the same design or a different design from left swing arm 116. It is further contemplated that only one swing arm is used.

In the exemplary configuration illustrated in FIG. 2A, the left swing arm 114 may couple with a disc rotor 138 and the rear wheel 112 via a bolt, such as a rear axle bolt 141.

The right swing arm 112 is positioned between a belt or chain guard 140 and a cush drive 142, which is configured to reduce stress on the wheel 112 and other components. The belt or chain guard 140 may protect a rear drive assembly 144 from certain environmental conditions, such as rain, dirt, and dust.

In particular, the rear drive assembly 144 may include a rear pulley 146 positioned between rear base plates 148. As shown, the rear pulley 146 may couple with a rear drive plate 150 for transmitting driving force from the shaft 108 to the wheel 112. In certain embodiments, the drive plate 150 includes grooves for mating with ridges or teeth of the rear axle 124.

FIG. 2B illustrates the front end of the swing arms 114, 116 as they relate to the motor 102. The motor 102 may be a stressed member and part of the chassis. Advantageously, the swing arm pivot runs through the axis of the motor 102.

As shown, chassis plate 151 are coupled to the housing 104 on both sides of the motor 102. In certain embodiments, the motor 102 and the chassis plates 151 are secured by stainless steel bolts, such as McMaster-Carr® M8×1.25 mm thread, 150 mm long stainless steel bolts. In certain embodiments, housing 104 may include a mount for supporting the motor 102 and spacers for receiving the swing arms 114, 116.

As mentioned above, the shaft 108 projects from the housing 104. The shaft 108 is configured to support one or both swing arms 114, 116 and couple to a front drive assembly 152. More specifically, an opening defined by a circular portion of the blade insert 118 is configured to receive a right end 164 of the shaft 108.

Front drive assembly 152 includes a front drive plate 154, such as a splined drive plate, that is configured to couple with a front pulley 156. The front pulley may be positioned between front base plates 158. In operation, the shaft 108 is configured to couple with the front drive assembly 152, which can then transmit driving force the rear drive assembly 144 and to the rear wheel 112.

Figure 2C:
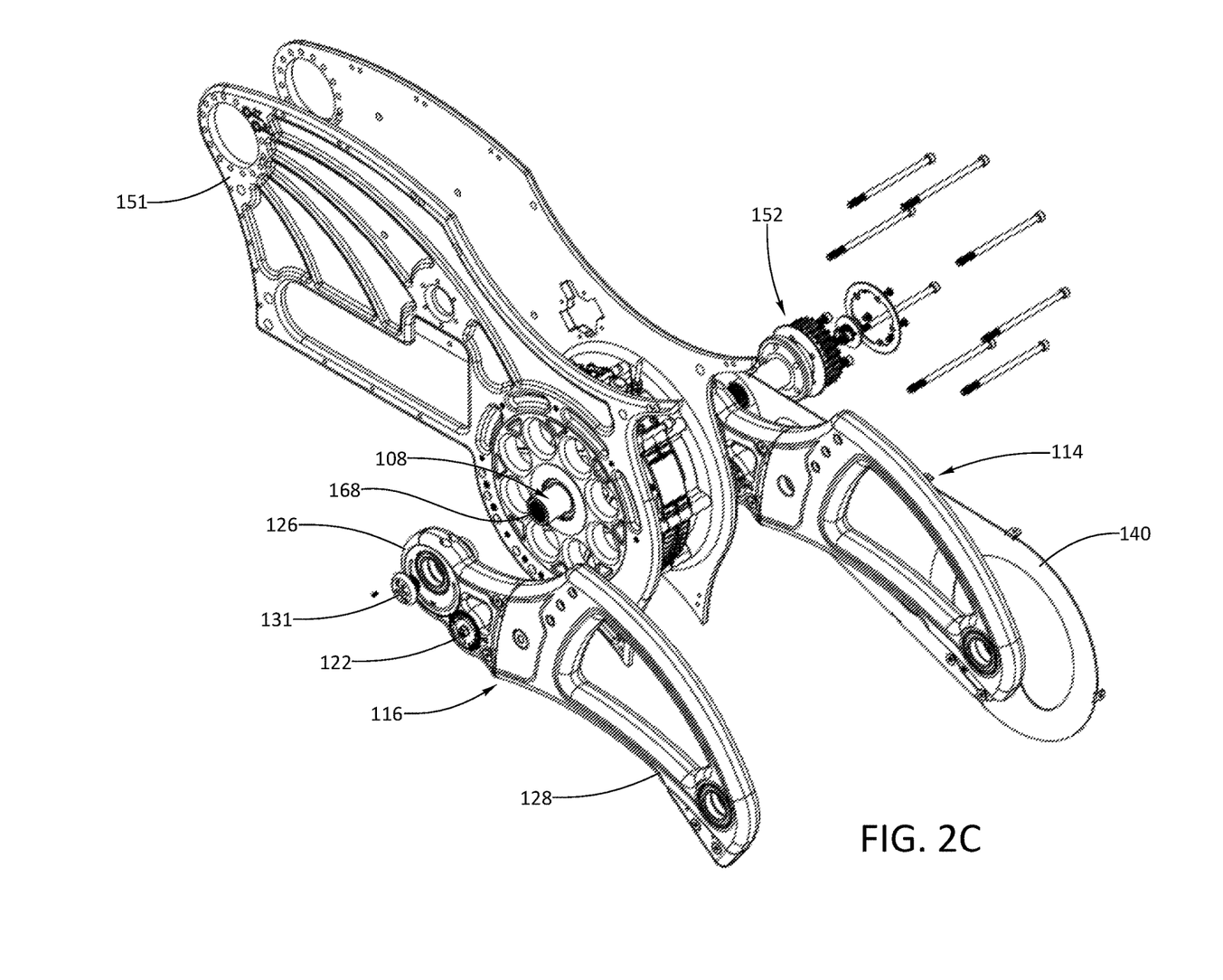
FIG. 2C illustrates a partial exploded view of the exemplary swing arm configuration of FIG. 1.

FIG. 2C illustrate an exploded perspective view from the left side of the swing arm configuration 100. As shown, the left swing arm 116 is supported on the shaft 108. More specifically, an opening defined by a circular portion of the blade insert 126 is configured to receive a left end 168 of the shaft 108. A front axle bolt 131 may connect to left end 168 for coupling the left swing arm 116 to the shaft 108.

FIG. 3A-FIG. 3D illustrate exemplary views of the shaft 108 used the swing arm configuration 100. The shaft 108 may be constructed from steel, aluminum alloy, other metal alloys, composite materials, or combinations of each. It is also contemplated that the rear axle 124 has a similar design as described below with reference to shaft 108.

The shaft 108 may have a height that is between about 20 mm and about 80 mm, preferably between about 30 mm and about 60 mm, and even more preferably between about 40 mm and about 50 mm. The length of the shaft 108 is between about 100 mm and about 500 mm, preferably between about 200 mm and about 300 mm, and even more preferably between about 230 mm and about 260 mm. The weight of the shaft 108 is between about 1 lbs and about 4 lbs, preferably between about 2 lbs and about 4 lbs, and even more preferably between about 2.75 lbs and about 3.25 lbs.

Figure 3A:
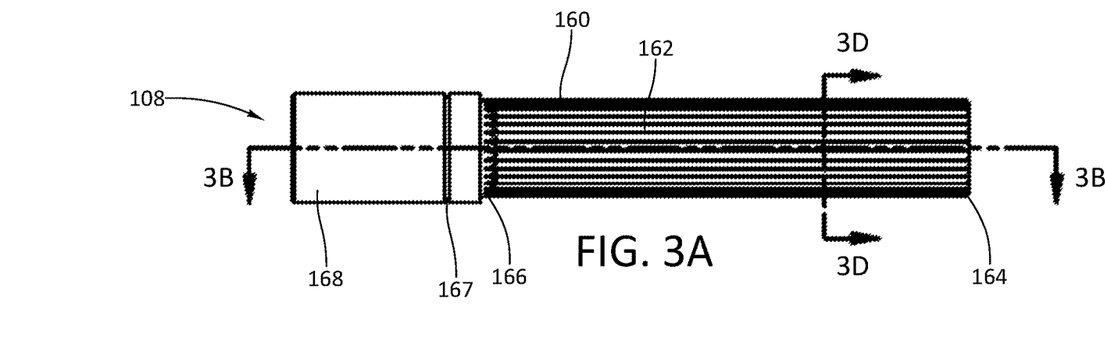
FIG. 3A illustrates a front view of a shaft used in the exemplary swing arm configuration of FIG. 1.

As shown, shaft 108 includes a splined section 160. The splined section 160 includes ridges or teeth for mating with grooves of a matching component, such as a gear and/or drive plate (e.g., drive plate 154) of a motor. In particular, splined section 160 is formed on a surface 162 of the shaft 108 from a right end 164 in a horizontal direction to a left portion 166.

Figure 3B:
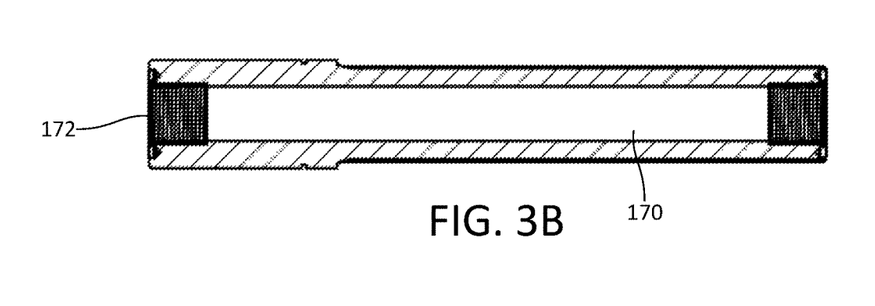
FIG. 3B illustrates a cross sectional view A-A of the shaft used in the exemplary swing arm configuration of FIG. 1.
Figure 3C:
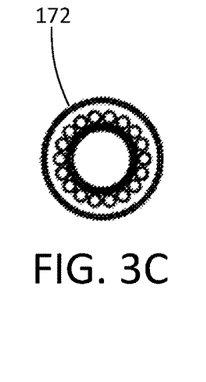
FIG. 3C illustrates a side view of the shaft used in the exemplary swing arm configuration of FIG. 1.
Figure 3D:
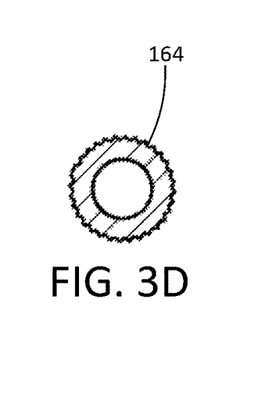
FIG. 3D illustrates a cross sectional view B-B of the shaft used in the exemplary swing arm configuration of FIG. 1.

FIG. 3D illustrates a cross section of the right end 164. The diameter of the right end 164 is between about 25 mm and about 50 mm, preferably between about 30 mm and about 40 mm, and even more preferably between about 32 mm and about 36 mm. The diameter of the left end 166 is between about 25 mm and about 50 mm, preferably between about 30 mm and about 40 mm, and even more preferably between about 36 mm and about 38 mm.

Turning back to FIG. 3A, the section of the shaft 108 that is not splined includes a groove 167. The groove 167 is configured to hold a retaining ring, such as a McMaster-Carr® External Retaining Ring for 40 mm OD, Black-Phosphate 1060-1090 Spring Steel. The retaining ring may provide axial constrain to the inner race of one or more bearings that are positioned within the motor 102 housing 104.

A sprocket, such as drive sprocket 110 of FIG. 1, is mounted on a left end 168 of the shaft 108. As described above, chain or belt may then be wound around the sprocket for transmitting rotational motion of the shaft 108 to wheel 112.

FIG. 3B illustrates a cross section of the shaft 108. As shown, shaft 108 includes an interior cavity 170. The height of the interior cavity 170 is between about 10 mm and about 30 mm, preferably between about 15 mm and about 25 mm, and even more preferably between about 19 mm and about 21 mm.

Sections of the interior cavity 170 may be configured to receive fasteners, such as a threaded bolt, for securing the shaft 108 to, for example, a swing arm. In addition, the shaft 108 is pivotally supported at the left end 168 by, for example, a bearing 172.

As shown in FIG. 3C, the bearing 172 may be a ball bearing. In certain embodiments, the bearing 172 has eighteen balls, each ball having a diameter between about 2 mm and about 7 mm, preferably between about 3 mm and about 6 mm, and even more preferably between about 4 mm and about 5 mm.

Figure 4:
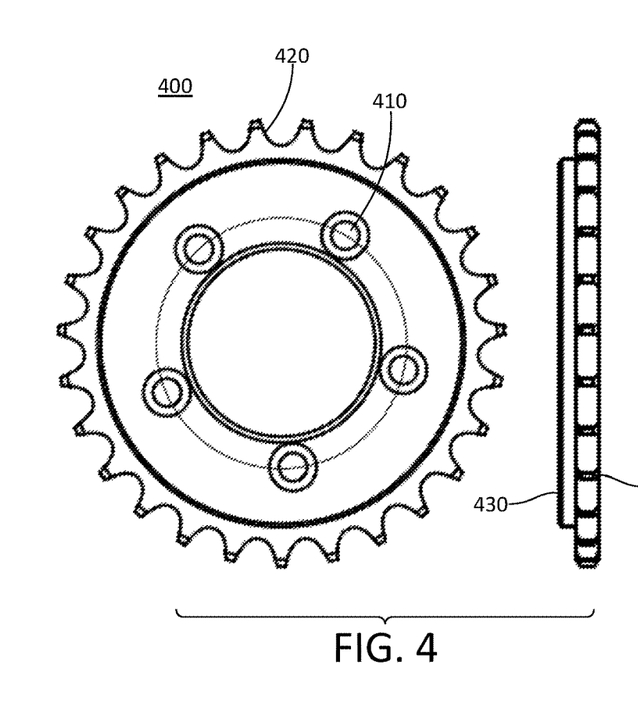
FIG. 4 illustrates an exemplary drive sprocket for use in a swing arm configuration.

FIG. 4 illustrates an exemplary drive sprocket 400 for use with a swing arm configuration. It is contemplated that drive sprocket 400 and drive sprocket 110 are the same.

The drive sprocket 400 is coaxial to a shaft, such as shaft 108, and secured to a portion of the shaft projecting from a swing arm, such as swing arm 114. In particular, drive sprocket 400 includes apertures 410 for rotatably coupling to a swing arm. As shown, the drive sprocket 400 may include five apertures having a diameter between about 5 mm and about 15 mm, preferably between about 8 mm and about 12 mm, and even more preferably between about 9 mm and about 10 mm.

A front surface 430 of the drive sprocket may have a diameter between about 100 mm and about 140 mm, preferably between about 110 mm and about 130 mm, and even more preferably between about 115 mm and about 120 mm.

A back surface 440 of the drive sprocket 400 may have a diameter between about 100 mm and about 150 mm, preferably between about 110 mm and about 140 mm, and even more preferably between about 125 mm and about 135 mm. In addition, the back surface includes a plurality of teeth 420 for engaging a chain or belt. While the plurality of teeth 420 are shown to have rounded ends, other shapes are contemplated.

Figure 5:
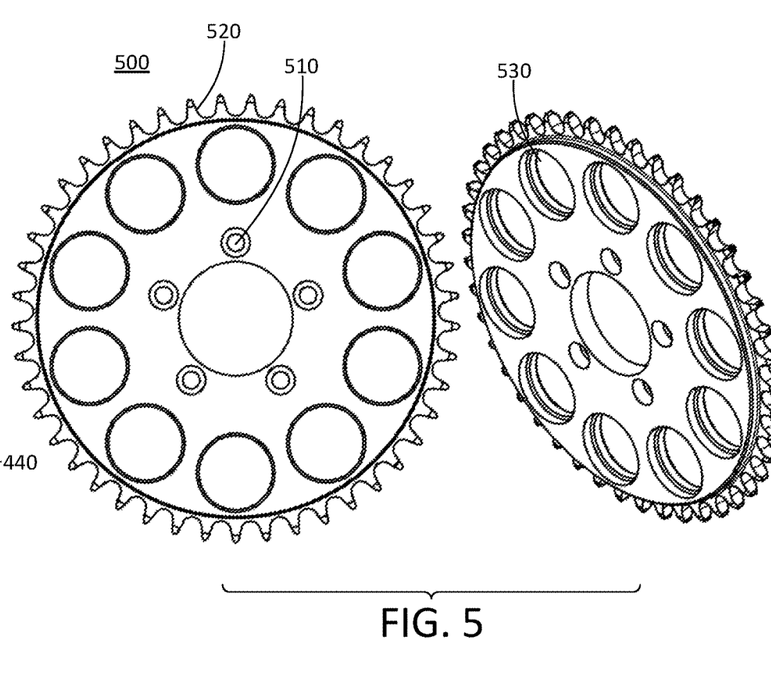
FIG. 5 illustrates an exemplary drive sprocket for use in a swing arm configuration.

FIG. 5 illustrates an exemplary driven sprocket 500 for use with a swing arm configuration. It is contemplated that drive sprocket 400 and drive sprocket 110 are the same.

The driven sprocket is secured to a rear axle of a wheel. In particular, driven sprocket 500 includes one or more apertures 510 for rotatably coupling to a swing arm. Embodiments of the driven sprocket 500 may include 5 apertures having a diameter between about 5 mm and about 15 mm, preferably between about 8 mm and about 12 mm, and even more preferably between about 9 mm and about 10 mm.

In addition, driven sprocket 500 may include openings 530. In certain embodiments, the driven sprocket 500 includes 10 openings have a diameter between about 20 mm and about 60 mm, preferably between about 30 mm and about 50 mm, and even more preferably between about 35 mm and about 45 mm. In certain embodiments, the diameter of each opening is approximately 39 mm.

As shown, driven sprocket 500 includes a plurality of teeth 520 for engaging a chain or belt. This facilitates transmitting a driving force from a drive sprocket to a wheel coupled to the driven sprocket 500. While the plurality of teeth 520 are shown to have rounded ends, other shapes are contemplated.

Figure 6:
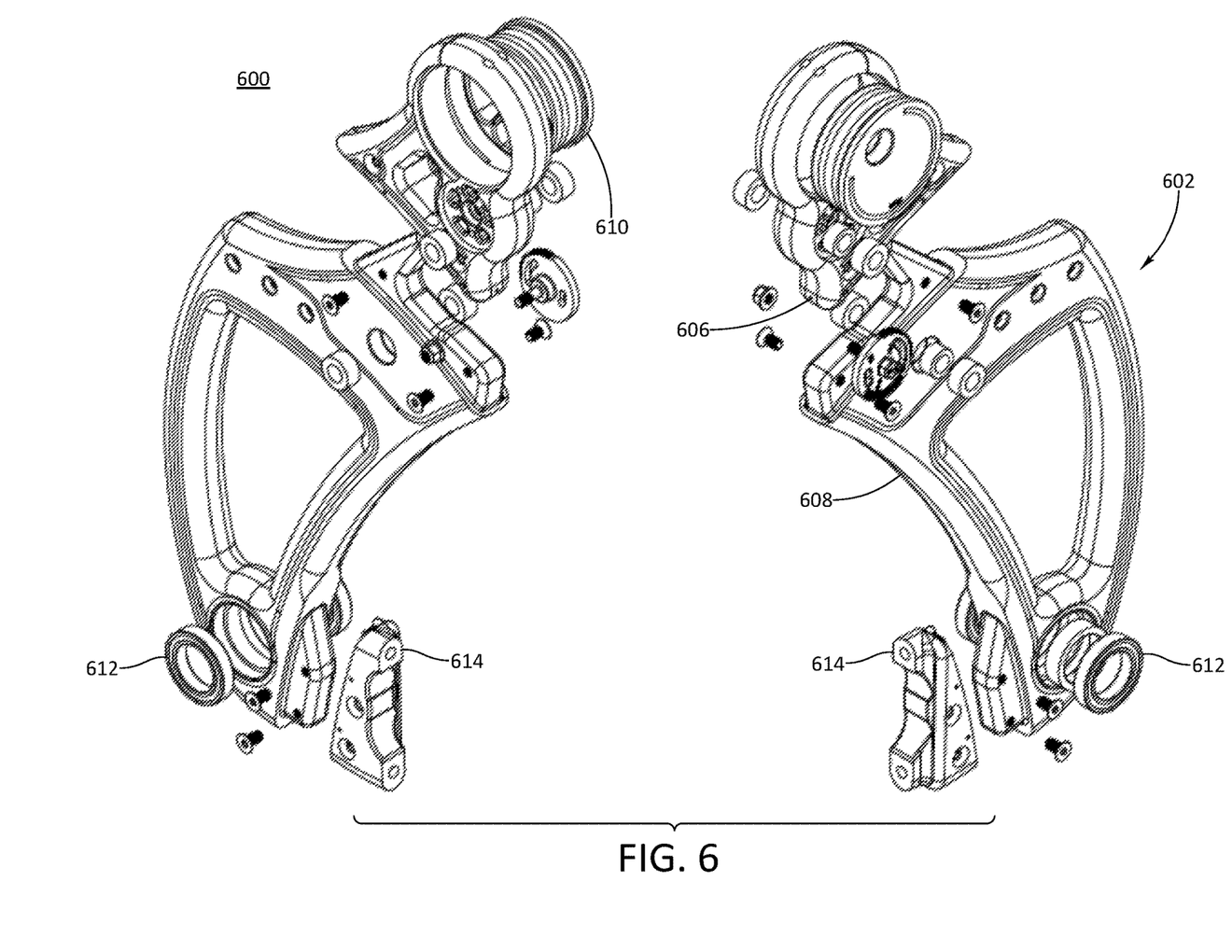
FIG. 6 illustrates an exemplary front suspension assembly for use with a swing arm configuration.

FIG. 6 illustrates an exemplary front suspension assembly 600. Front suspension assembly 600 includes a front right blade 602 and a front left blade 604. In certain embodiments, the front right blade 602 and the front left blade 604 have a similar design and construction as the right swing arm 114 and the left swing arm 116, respectively. As shown, both front blades 602, 604 of the assembly 600 include blade inserts 606 configured to couple with suspension blades 608.

Blade insert 606 of the front right blade 602 includes an eccentric 610. Employment of the tuning eccentrics 610 may facilitate adjustment of the trail to satisfy varying conditions, and rider preferences. These gear driven units may alter the effective length of the upper control arms (not shown). In certain embodiments, available trail values are 3.5 to 4.5 inches in either the 27 or 31 degree rake position.

The suspension blades 608 include an opening for receiving a bearing 612 through which a front wheel axle is positioned. In addition, as shown, suspension blades 608 are coupled with brake caliper mounts 614 via hardware. As with swing arms 114, 116, a brace may connect the front suspension blades 608.

The exemplary front suspension assembly 600 is configured to narrow the frontal area of a motorcycle for aerodynamics and efficiencies at speed. Front suspension assembly 600 may further reduce stiction. This is because the assembly 600 does not rely on isolating bushings for tubes to telescope smoothly, or rake angles to counter deflection of those tubes as they vector impact forces from irregularities in the road surface to the chassis.

Multi-link front suspension systems, such as suspension assembly 600, have inherent torsional rigidity, and when properly tuned, are inherently anti-dive as the loads applied during braking are not transferred directly to the chassis through the spring. Furthermore, front suspension assembly 600 facilitates altering front wheel trajectories by varying length and placement of the connecting links with eccentrics. This trail value fine tuning has the advantage of altering trail values for any given suspension or rake angle setting.

Figure 7A:
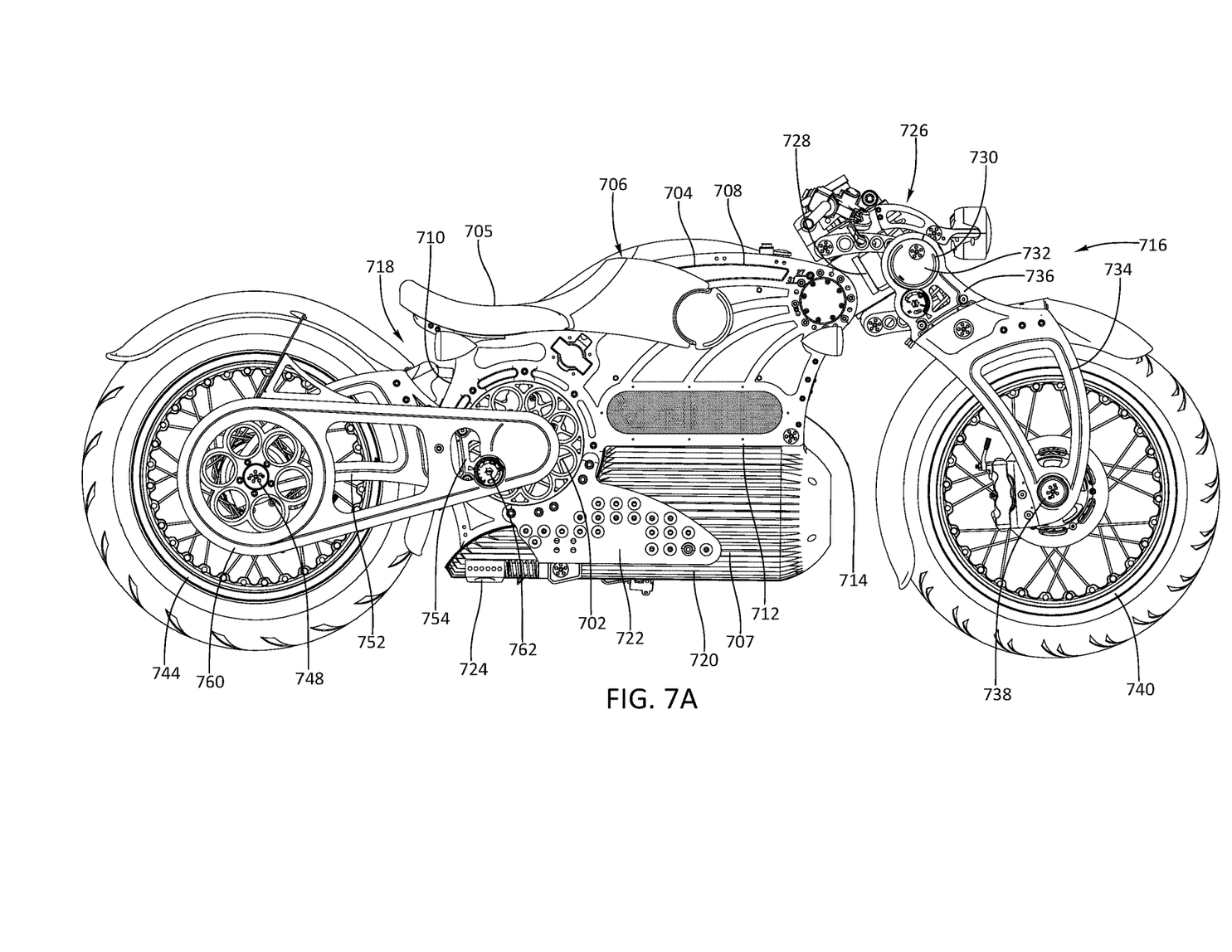
FIG. 7A illustrate a side view of an exemplary motorcycle including a swing arm configuration.
Figure 7B:
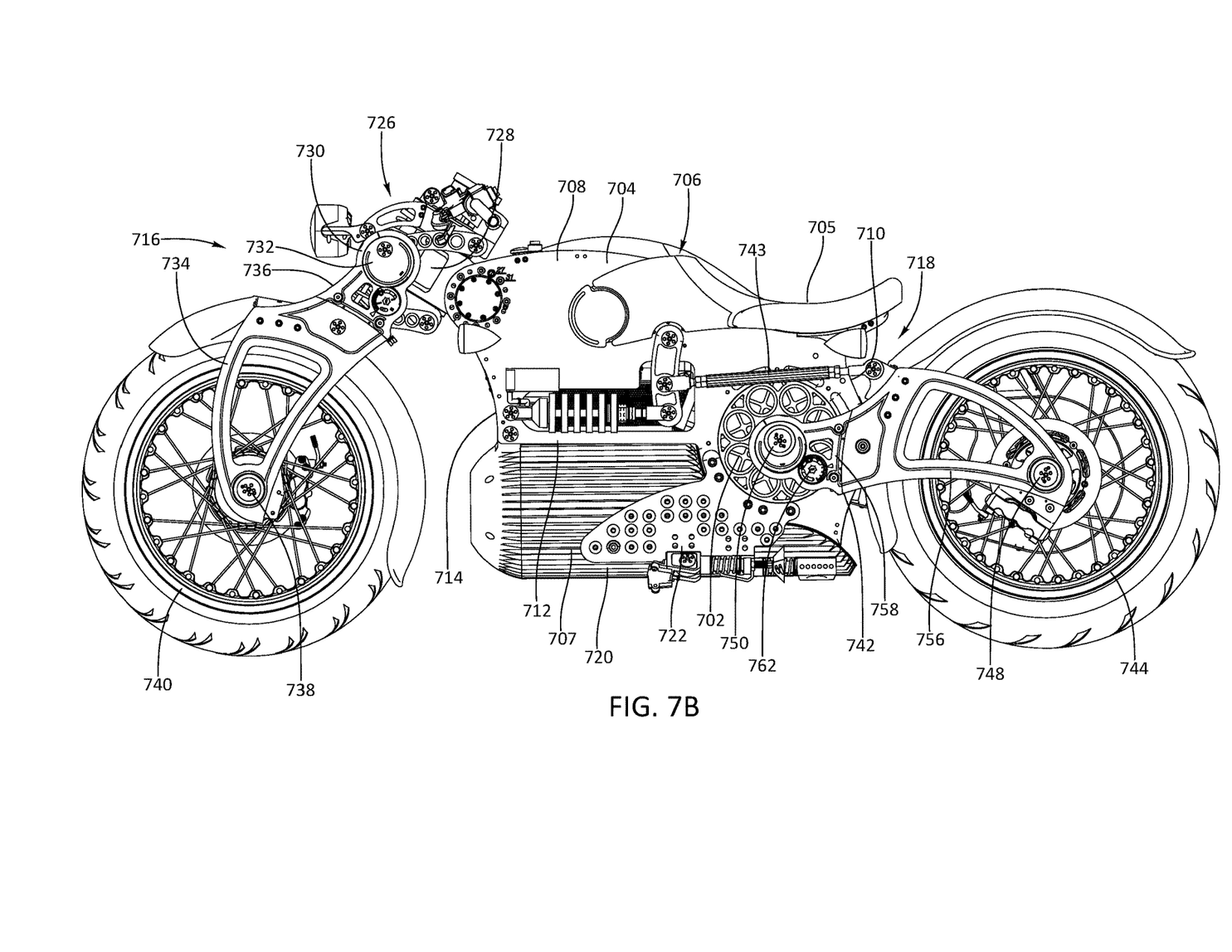
FIG. 7B illustrate a side view of the exemplary motorcycle of FIG. 7A.
Figure 7C:
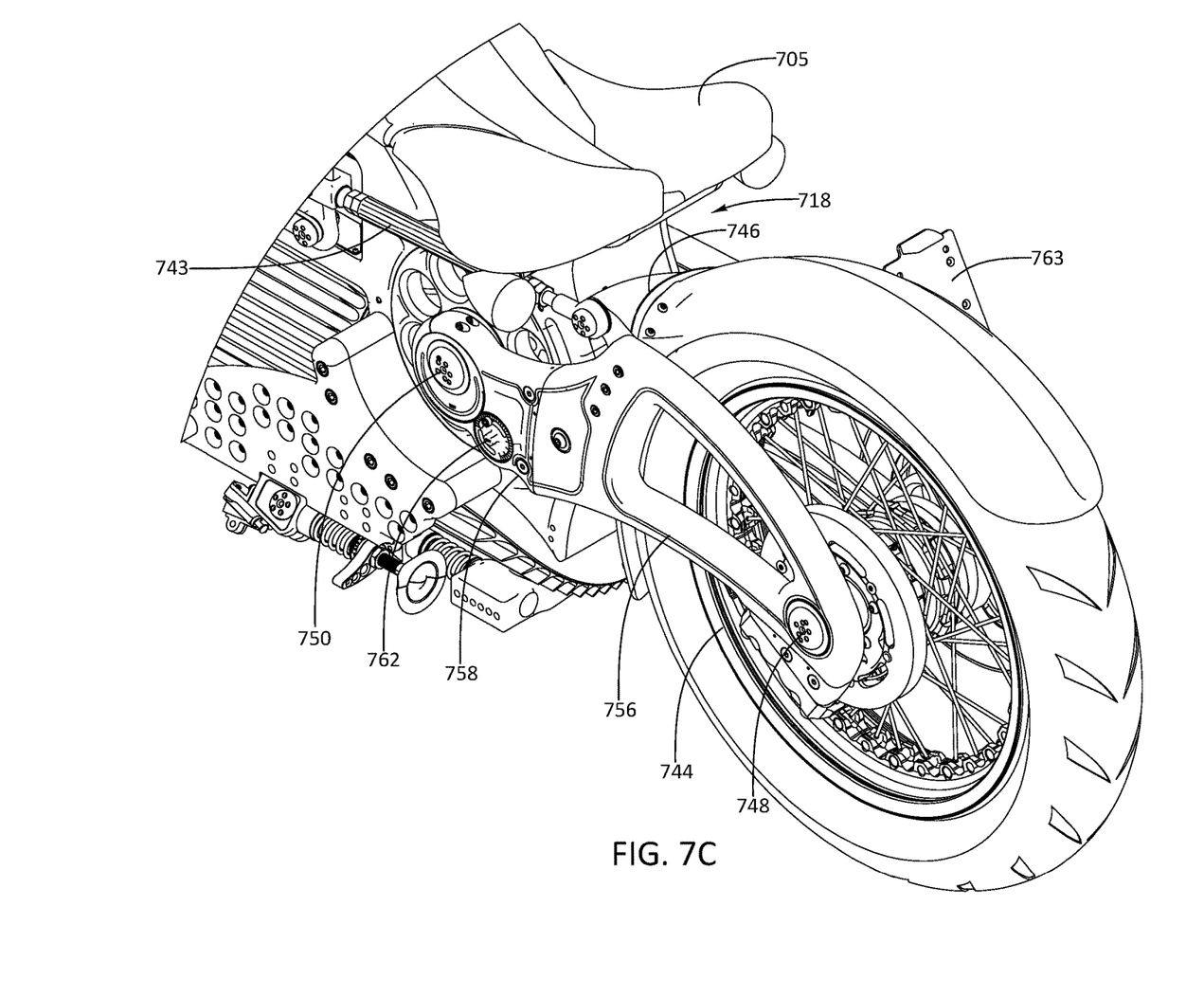
FIG. 7C illustrate a rear perspective view of the electric motorcycle of FIG. 7A.

FIG. 7A-FIG. 7C illustrate an exemplary electric motorcycle 700 including a m swing arm configuration. As shown, the motorcycle 700 includes an electric motor 702 within a housing 703.

The housing 703 may further include an inverter which generates AC current by electric power supplied from a battery 707 for storing the electric power to the inverter and supplying it to the motor 702. These and other electrical components may be connected with gauge 2 wire. One example of an inverter is a Cascadia Motion PM100 propulsion inverter. The battery 707 may be a lithium-ion battery or 399 VDC battery and feature a capacity of, for example, 16.8 kWh.

The motor 702 may be a high density axial flux electric motor that is configured to operate via the AC current generated by the inverter. Examples of power output by the motor 702 may be in the range of 49-217HP. In addition, the electric motorcycle 700 may output a continuous torque of 147 lbs per foot and be driven for up to 60 miles on the highway and up to 100 miles in the city.

As shown in FIG. 7A and FIG. 7B, the motor 702 is supported by chassis plates 704. Chassis plates 704 includes a number of openings or indents for receiving a one or more components of the electric motorcycle 700, such as a frame 706. The frame 706 includes a seating area 705 centrally positioned above the motor 702 for a user to sit on while riding. In certain embodiments, the seating area 705 may be 28" from the ground.

In certain embodiments, the chassis 704 is a triple load path monocoque chassis that can protect a motor from any type of shock or vibration that the motor may face from everyday use. In addition, the chassis plate 704 may be shaped to have a curved top portion 708, a circular back portion 710, a linear bottom portion 712, and a tapering front portion 714. The tapering front portion 714 is connected to a front assembly 716 and the circular back portion 710 is connected to a rear assembly 718. Other shapes of the chassis plate 704 are contemplated.

The chassis may further support a battery enclosure 720, such as the illustrated bullet-shaped enclosure. The battery enclosure 720 may safely house battery cells and a battery management system. A controller may connect or be fixed to the inside of the enclosure 720 so as to control the drive of the motor 702. In addition, the battery enclosure 720 may serve as a heat sink for the power train, eliminating the need for a separate radiator.

The enclosure 720 may be constructed from carbon fiber, steel, aluminum alloy, other metal alloys, composite materials, or combinations of each. In certain embodiments, the enclosure is made from 6061 Al-T6. Also, the enclosure 720 may be entirely structural, tying in with the rest of the chassis and allowing battery updates to be performed easily.

As shown, the circular back portion 710 of the chassis plate 704 may connect to one end of the battery enclosure 720. A second end of the battery enclosure may attach to the tapering front portion 714.

A column 722 may extend from chassis plate 704. The column 722 may include a number of indents for attachment of a column cover or footrest. In addition, the column 722 may include one or more kickstands 724. As shown, the kickstands 724 may include a circular cup-like bottom portion for gripping a surface, such as the ground. The kickstands may be in a driving position while operating the motorcycle or a parked position to prevent the motorcycle from falling when not in use. A user may manually adjust the position of the kickstands 724. It is also contemplated that the motorcycle 700 may be configured to automatically position the one or more kickstands 724. For example, the motorcycle 900 may include a pressure sensor that facilitates positioning of a kickstand based on whether a user is sitting on the seating area 705 for a predetermined period of time.

As shown in FIG. 7B, The front assembly 716 of the motorcycle 700 includes a neck assembly 726 comprising certain motorcycle components, such as a front suspension system, headlights, and handle bars. Neck assembly 726 may further include a steering stem 728 within a steering neck. The steering stem 728 includes a top tree connected to a bar claim via a shoulder nut. The steering neck may be adjustable and machined from solid billet to house large OD/large ID steering stem bearings for maximum stability.

A front suspension 730 is coupled to the steering stem 728 via one or more suspension links. The front suspension 730 may include an eccentric mechanism 732, such as a circular disk fixed to a rotating axle. Employment of the tuning eccentrics may facilitate adjustment of the trail to satisfy varying conditions and rider preferences.

A suspension blade 734 is connected to the front suspension via a blade insert 736. At the bottom end, a front axle 738 couples a front wheel 740 and supports the suspension blade 734. One example of the front wheel 740 and tire is a 110/80 R19 on BST Carbon Fiber Wheel. Embodiments of electric motorcycle 700 may have a wheel base of 62" and a ground clearance of 9.5".

Components positioned between the front wheel 740 and suspension blade 734 may include, but are not limited to, a brake caliber mount, a wheel spacer, and a hub cover. In addition, the motorcycle may include front brake system and rear brake system. An example of a front brake system includes 4×230 MM Beringer floating aeronal cast iron discs with four-piston Beringer radially-mounted Aerotec calipers. Example of a rear brake system includes 2×230 MM Beringer floating aeronal cast iron discs with four-piston Beringer radially-mounted Aerotec calipers.

As shown in FIG. 7A and FIG. 7B, the rear assembly 718 includes a swing arm 742 on each side of the motorcycle, each swing arm 742 is coupled to a rear wheel 744. The rear assembly 718 may further include a rear suspension 743, such as an adjustable suspension push rod, for shock-absorption of the rear wheel 744. One example of the rear wheel 744 and tire is a 120/80 R19 on BST Carbon Fiber Wheel.

The swing arms 742 are connected by a brace 746 (FIG. 7C). Each swing arm 742 attaches to a rear axle 748 of the rear wheel 744 at a first end and a shaft 750 of the motor 702 at a second end.

On the right side of the electric motorcycle 700, the rear axle 748 supports a driven element, such as sprocket 500 of FIG. 5, for transmitting power to the rear wheel 744. The driven element is connected via a belt or chain to a drive element, such as drive sprocket 400 of FIG. 4, which is mechanically connected to the rear wheel 744. A cover 760 may house the belt or chain and protect components of the motorcycle 700 from various environmental conditions, such as rain, dirt, and dust. In certain embodiments, a license plate holder 763 extends from the cover 760.

Positioned between the rear wheel 744 and the driven element is a right suspension blade 752 of a swing arm. The suspension blade 752 is attached to a blade insert 754, which is connected to the shaft 750 of the motor 702. Hence, the swing arms 742 are supported by the shaft 750, which acts as the swing arm pivot as well as the drive shaft.

As shown in FIG. 7B and FIG. 7C, on the left side of the electric motorcycle 700, the rear axle 748 supports a left suspension blade 756. The suspension blade 756 is connected to a left blade insert 758 which is supported by the shaft 750. The blade insert 758 may rotate on bearings and couple to the motor 702 housing 703 through apertures which, in one embodiment, thread into the motor.

Moreover, the blade insert 758 includes an idler gear 762. The idler gear 762 may facilitate altering the effective swing arm angles. As mentioned above, the angle of the swing arm may dictate the action of the rear suspension under acceleration, and may either causes compression or rebound. For example, by attaching the swing arm pivot directly to the shaft and utilizing an adjustable suspension push rod, alternate swing arm angles can be selected by adjustment of the push rod length. This adjustment may allow for precision tuning for a variety of wheel sizes, rake angles, and rider weights while maintaining appropriate ground clearances.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

The invention claimed is:

1. An electric motorcycle including a swing arm configuration, comprising;
   a housing supported by a chassis;
   a power source configured to supply power to an electric motor within the housing; and
   a singular shaft operatively connected to the motor and pivotably connected to a swing arm assembly, wherein said swing arm assembly is supported by said shaft, and said shaft mechanically connected to a rear wheel and configured for transmitting rotational motion to the rear wheel.

2. The electric motorcycle including a swing arm configuration of claim 1, wherein the swing arm assembly comprises one or more swing arms.

3. The electric motorcycle including a swing arm configuration of claim 1, wherein said swing arms are connected via a brace.

4. The electric motorcycle including a swing arm configuration of claim 3, wherein the brace is semi-circular to wrap around the rear wheel.

5. The electric motorcycle including a swing arm configuration of claim 2, wherein each swing arm is substantially triangular in shape.

6. The electric motorcycle including a swing arm configuration of claim 2, wherein each swing arm comprises a blade insert and a suspension blade.

7. The electric motorcycle including a swing arm configuration of claim 6, wherein said shaft is positioned through an opening of the blade insert which is configured to rotate on bearings.

8. The electric motorcycle including a swing arm configuration of claim 6, wherein the blade insert includes an idler gear for altering an angle of said swing arm assembly.

9. The electric motorcycle including a swing arm configuration of claim 1, wherein the power source is housed within an enclosure, the enclosure supported by said chassis.

10. The electric motorcycle including a swing arm configuration of claim 9, wherein the enclosure is bullet shaped.

11. The electric motorcycle including a swing arm configuration of claim 1, wherein said shaft includes a splined portion.

12. The electric motorcycle including a swing arm configuration of claim 1, further comprising:
   a front assembly including a front wheel connected to a suspension blade assembly, the suspension blade assembly including a suspension blade and a blade insert; and
   an eccentric mechanism of the blade insert configured to alter the distance between the front wheel and the chassis.

\* \* \* \* \*